United States Patent
Lavi et al.

(10) Patent No.: US 9,659,219 B2
(45) Date of Patent: May 23, 2017

(54) COMPUTER-AIDED VIDEO PRODUCTION TRIGGERED BY MEDIA AVAILABILITY

(71) Applicant: Wochit Inc., New York, NY (US)

(72) Inventors: Eitan Lavi, Tel Aviv Jaffa (IL); Amotz Hoshen, Tel Aviv (IL); Ran Oz, Maccabim (IL); Dror Ginzberg, Nir-Zvi (IL); Ron Maayan, Tel Aviv (IL)

(73) Assignee: WOCHIT INC., New York, NY (US)

( * ) Notice: Subject to any disclaimer, the term of this patent is extended or adjusted under 35 U.S.C. 154(b) by 297 days.

(21) Appl. No.: 14/624,593

(22) Filed: Feb. 18, 2015

(65) Prior Publication Data

US 2016/0240225 A1   Aug. 18, 2016

(51) Int. Cl.
| G06F 17/00 | (2006.01) |
| G06K 9/00 | (2006.01) |
| G11B 27/031 | (2006.01) |
| G11B 27/34 | (2006.01) |

(52) U.S. Cl.
CPC ..... G06K 9/00751 (2013.01); G06K 9/00718 (2013.01); G11B 27/031 (2013.01); G11B 27/34 (2013.01)

(58) Field of Classification Search
None
See application file for complete search history.

(56) References Cited

U.S. PATENT DOCUMENTS

| 6,085,201 A | 7/2000 | Tso |
| 6,744,968 B1 | 6/2004 | Imai et al. |
| 9,063,984 B1 * | 6/2015 | Sandland ............ G06F 17/3053 |
| 2002/0003547 A1 | 1/2002 | Wang et al. |
| 2002/0042794 A1 | 4/2002 | Konaka |
| 2004/0111265 A1 | 6/2004 | Forbes |
| 2006/0041632 A1 | 2/2006 | Shah |
| 2006/0149558 A1 | 7/2006 | Kahn et al. |
| 2006/0173916 A1 * | 8/2006 | Verbeck Sibley   G06F 17/30035 |
| 2006/0212421 A1 | 9/2006 | Oyarce |
| 2006/0274828 A1 | 12/2006 | Siemens et al. |
| 2006/0277472 A1 | 12/2006 | Yodo et al. |
| 2007/0244702 A1 | 10/2007 | Kahn et al. |
| 2008/0033983 A1 | 2/2008 | Ko |
| 2008/0104246 A1 | 5/2008 | Katz et al. |
| 2008/0270139 A1 | 10/2008 | Shi |
| 2008/0281783 A1 | 11/2008 | Papkoff et al. |
| 2009/0169168 A1 | 7/2009 | Ishikawa |
| 2010/0061695 A1 | 3/2010 | Furmanski et al. |
| 2010/0153520 A1 | 6/2010 | Daun et al. |
| 2010/0180218 A1 | 7/2010 | Boston et al. |
| 2010/0191682 A1 | 7/2010 | Takamatsu |

(Continued)

OTHER PUBLICATIONS

U.S. Appl. No. 13/874,496 Office Action dated Jan. 21, 2016.

(Continued)

*Primary Examiner* — Asher Kells

(74) *Attorney, Agent, or Firm* — D.Kliger IP Services Ltd.

(57) ABSTRACT

A method includes receiving multiple visual media items from one or more media databases, and associating the visual media items with one or more story topics. In response to deciding that a given story topic is associated with sufficient suitable visual media items, computer-aided creation of a video clip relating to the given story topic is initiated using the associated visual media items.

19 Claims, 2 Drawing Sheets

(56) References Cited

U.S. PATENT DOCUMENTS

| | | | |
|---|---|---|---|
| 2011/0109539 A1 | 5/2011 | Wu et al. | |
| 2011/0115799 A1 | 5/2011 | Imbruce | |
| 2011/0191339 A1* | 8/2011 | Ramanathan | G06F 17/30 707/732 |
| 2013/0195422 A1* | 8/2013 | Patil | H04N 21/23424 386/239 |
| 2013/0198204 A1* | 8/2013 | Williams | G06F 17/30283 707/748 |
| 2013/0294746 A1 | 11/2013 | Oz et al. | |
| 2014/0147095 A1 | 5/2014 | Oz et al. | |
| 2015/0020106 A1* | 1/2015 | Belyaev | H04N 21/4622 725/45 |
| 2015/0081696 A1 | 3/2015 | Ogawa | |
| 2015/0081713 A1* | 3/2015 | Alonso | G06Q 10/109 707/738 |
| 2016/0357770 A1* | 12/2016 | Wu | G06F 7/08 |
| 2016/0359791 A1* | 12/2016 | Zhang | H04L 51/32 |

OTHER PUBLICATIONS

U.S. Appl. No. 14/170,621 Office Action dated Dec. 8, 2015.
U.S. Appl. No. 14/214,964 Office Action dated Jul. 14, 2016.
U.S. Appl. No. 13/874,496 Office Action dated Jul. 15, 2016.
U.S. Appl. No. 13/874,496 Office Action dated Jul. 7, 2015.
Zisman et at., U.S. Appl. No. 14/214,964 dated Mar. 16, 2014.

* cited by examiner

COMPUTER-AIDED VIDEO PRODUCTION TRIGGERED BY MEDIA AVAILABILITY

FIELD OF THE INVENTION

The present invention relates generally to multimedia generation, and particularly to methods and systems for computer-aided generation of multimedia content.

SUMMARY OF THE INVENTION

An embodiment of the present invention that is described herein provides a method including receiving multiple visual media items from one or more media databases, and associating the visual media items with one or more story topics. In response to deciding that a given story topic is associated with sufficient suitable visual media items, computer-aided creation of a video clip relating to the given story topic is initiated using the associated visual media items.

In some embodiments, associating the visual media items with the story topics includes determining a respective story topic for each visual media item, and clustering the visual media items by finding textual similarities among the story topics.

In some embodiments, deciding that the given story topic is associated with sufficient suitable visual media items includes assigning ranks to the received visual media items, evaluating a composite score for the given story topic based on the ranks of the visual media items associated with the given story topic, and deciding that the given story topic is associated with sufficient suitable visual media items depending on the composite score. Assigning a rank to a given visual media item may include creating for the visual media item a list of one or more topics, and calculating the rank for the given visual media item based on scores given to the topics.

In an embodiment, the scores are assigned to the topics based on at least one of: social-media popularity of the topics; estimated sentiment toward the topics; counts of media items in which the topics appear; types of the media items in which the topics appear; and availability of audio content relating to the topics. In an example embodiment, assigning a rank to a given visual media item includes ranking the given visual media item based on social-media popularity of the given visual media item.

In another embodiment, deciding that the given story topic is associated with sufficient suitable visual media items includes deciding that a social-media popularity measure of the given story topic meets a predefined criterion. In yet another embodiment, deciding that the given story topic is associated with sufficient suitable visual media items includes deciding that a count of the visual media items associated with the given story topic meets a predefined criterion. In still another embodiment, deciding that the given story topic is associated with sufficient suitable visual media items includes detecting that the given story topic is undergoing a shift in sentiment.

In some embodiments, initiating the computer-aided creation includes presenting to a human moderator one or more candidate story topics for which sufficient suitable visual media items are available, and receiving from the human moderator a selection of the story topic for which the video clip is to be created. Presenting the candidate story topics may include displaying to the human moderator multiple windows, which correspond to the respective candidate story topics and whose sizes depend on respective composite scores assigned to the candidate story topics.

There is additionally provided, in accordance with an embodiment of the present invention, an apparatus including an interface and one or more processors. The interface is configured to receive multiple visual media items from one or more media databases. The processors are configured to associate the visual media items with one or more story topics, and, in response to deciding that a given story topic is associated with sufficient suitable visual media items, to initiate computer-aided creation of a video clip relating to the given story topic using the associated visual media items.

There is further provided, in accordance with an embodiment of the present invention, a computer software product, including a non-transitory computer-readable medium in which program instructions are stored, which instructions, when read by one or more processors, cause the processors to receive multiple visual media items from one or more media databases, to associate the visual media items with one or more story topics, and, in response to deciding that a given story topic is associated with sufficient suitable visual media items, to initiate computer-aided creation of a video clip relating to the given story topic using the associated visual media items.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for computer-aided generation of video clips. In some embodiments, a video generation system receives media items, such as video excerpts, images, Web pages, audio excerpts and textual items, from various sources, and automatically generates video clips using these items.

In the disclosed embodiments, creation of a video clip is triggered by the availability of sufficient suitable visual media that can be used for generating the clip. The suitability of a visual media item can be quantified, for example, based on relevance to the story topic of the clip, social-media popularity or other factors. Typically, the system automatically identifies the story topic of each visual data item, e.g., based on metadata, and clusters the visual media items per story topic. The system initiates creation of a video clip on a given story topic upon deciding that the story topic is associated with sufficient suitable visual media items.

In one example flow, the system derives a list of topics for each visual media item by analyzing the media items' metadata. The system ranks the topics across different media assets, based on factors such as relevance of each topic to a given asset, and popularity of that asset on social media platforms. The system then assigns scores to the visual media items based on the ranks of their underlying topics. Finally, the system ranks the story topics based on the scores of their associated visual media items. The highest-ranking story topics are presented to a human moderator, who chooses the story topics for which the system will generate video clips.

The rationale behind the disclosed technique is that a video clip cannot be generated unless sufficient suitable visual media is available. Therefore, it is advantageous to verify the media availability in advance. It is possible in principle to trigger video-clip creation by other events, e.g., in response to a story topic of interest. In such a solution, however, the system may spend resources in an attempt to generate a video clip, only to discard it later for lack of sufficient suitable media.

When triggering video-clip creation by media availability, the limited human and computer resources of the video generation system are spent only on clips whose generation is likely to succeed. The disclosed techniques are therefore particularly effective in large-scale applications that generate a large volume of video clips, possibly in real-time.

For example, in many practical implementations the scarcest resource is the time and attention of human moderators. When using the disclosed techniques, this resource is used efficiently because the moderators are presented only with candidate story topics that are likely to be converted successfully into video clips.

System Description

Figure 1:
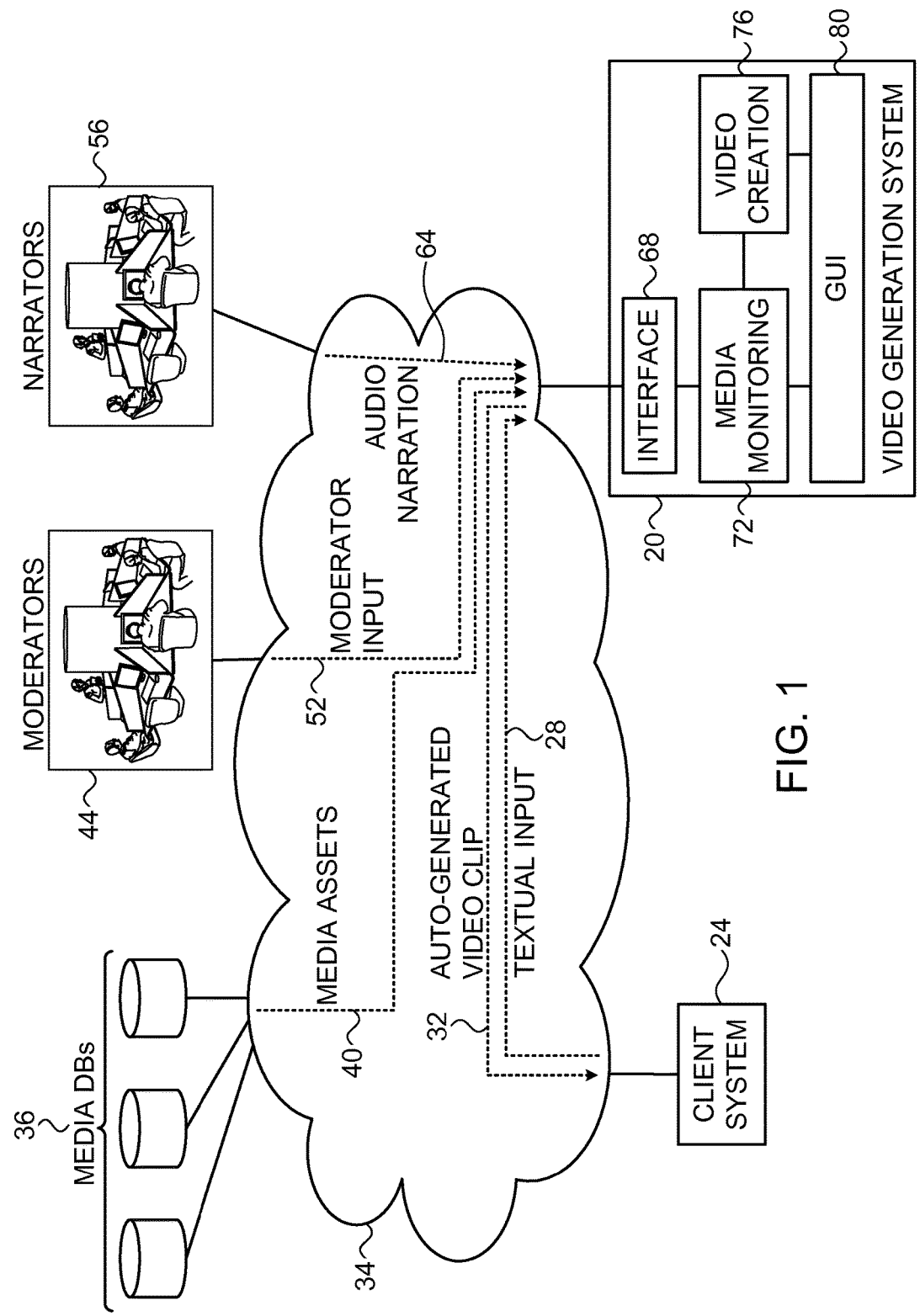
FIG. 1 is a block diagram that schematically illustrates a system for computer-aided media-availability-driven generation of video clips, in accordance with an embodiment of the present invention.

FIG. 1 is a block diagram that schematically illustrates a system 20 for computer-aided generation of video clips, in accordance with an embodiment of the present invention. System 20 collects visual media assets from various media databases 36, and generates video clips 32 using the visual media assets. As will be explained in detail below, the automated creation of a video clip on a certain story topic is triggered by availability of sufficient suitable visual media associated with this story topic.

In an example flow, although not necessarily, system 20 may receive from a client system 24 textual articles 28 relating to various topics, and create video clips 32 for the textual articles provided that sufficient suitable visual media is available. The video clips are sent to client system 24. System 20 communicates with client system 24 over a communication network 34, e.g., the Internet.

In alternative embodiments, however, system 20 may receive textual inputs from other sources, or create video clips 32 regardless of any textual input or any specific client system. System 20 can thus be used in a variety of business models and modes of operation. Additional details of video generation processes that may be performed by system 20 are addressed in U.S. patent application Ser. Nos. 14/170,621 and 14/214,964, which are assigned to the assignee of the present patent application and whose disclosures are incorporated herein by reference.

In some embodiments, system 20 communicates over network 34 with one or more media databases (DBs) 36 so as to retrieve media assets 40. The media assets are also referred to as media items. Media items may comprise, for example, visual media items such as video excerpts, still images, Web-page snapshots, maps, graphs or various graphical elements. Other, non-visual examples of media items may comprise, for example, audio excerpts, textual excerpts, social-network information, and many others.

Media DBs 36 may comprise, for example, content Web sites, social-network servers or any other suitable database.

System 20 typically presents candidate story topics and associated media assets to a human moderator 44. The moderator uses the presented information to select story topics for which the system is to generate video clips.

System 20 typically uses multiple moderators 44 for handling a large throughput of video clips simultaneously. Moderator 44 may also review and select media assets that will be included in the video clips, or otherwise assist or supervise the automated generation process. The moderator thus produces moderator input 52, which is fed back to system 20 over network 34.

In addition to moderator input 52, system 20 may further receive audio narration 64 to accompany the video clip. The audio narration is produced by a narrator 56 and provided to system 20 over network 34. System 20 typically uses multiple narrators 56 for narrating the various textual inputs.

Based on moderator input 52 and audio narration 64, system 20 automatically produces video clip 32. In some embodiments, the automatically-generated video clip is verified by one of moderators 44 before it is finally approved for release. Audio narration 64 is also optionally verified for quality by moderators 44.

In the example of FIG. 1, system 20 comprises an interface 68 for communicating over network 34, a media monitoring unit 72 for obtaining and processing media assets 40, a video creation unit 76 for generating video clips 32, and a Graphical User Interface (GUI) unit 80 for interacting with moderators 44. Units 72, 76 and 80 may be implemented, for example, using software running on one or more processors. The processors may or may not be collocated. For example, GUI unit 80 may be physically adjacent to moderator 44, e.g., implemented on a terminal or workstation of the moderator.

The system configuration shown in FIG. 1 is an example configuration, which is chosen purely for the sake of conceptual clarity. In alternative embodiments, any other suitable system configuration can be used. For example, the disclosed techniques need not necessarily be implemented by separate media monitoring, video creation and GUI units, and may be implemented using any desired number of units of any suitable functionality.

The elements of system 20 may be implemented using software, using suitable hardware/firmware, or using a combination of hardware/firmware and software elements. In some embodiments, the functions of units 72, 76 and/or 80 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Triggering Video-Clip Generation by Media Availability

In some embodiments, system 20 identifies story topics for which sufficient suitable visual media items are available, and presents these story topics to moderators 44 as candidates for video-clip creation. The description that follows presents one example method of carrying out this technique. This method, however, is depicted purely by way of example. In alternative embodiments, any other suitable method or implementation can be used.

Figure 2:
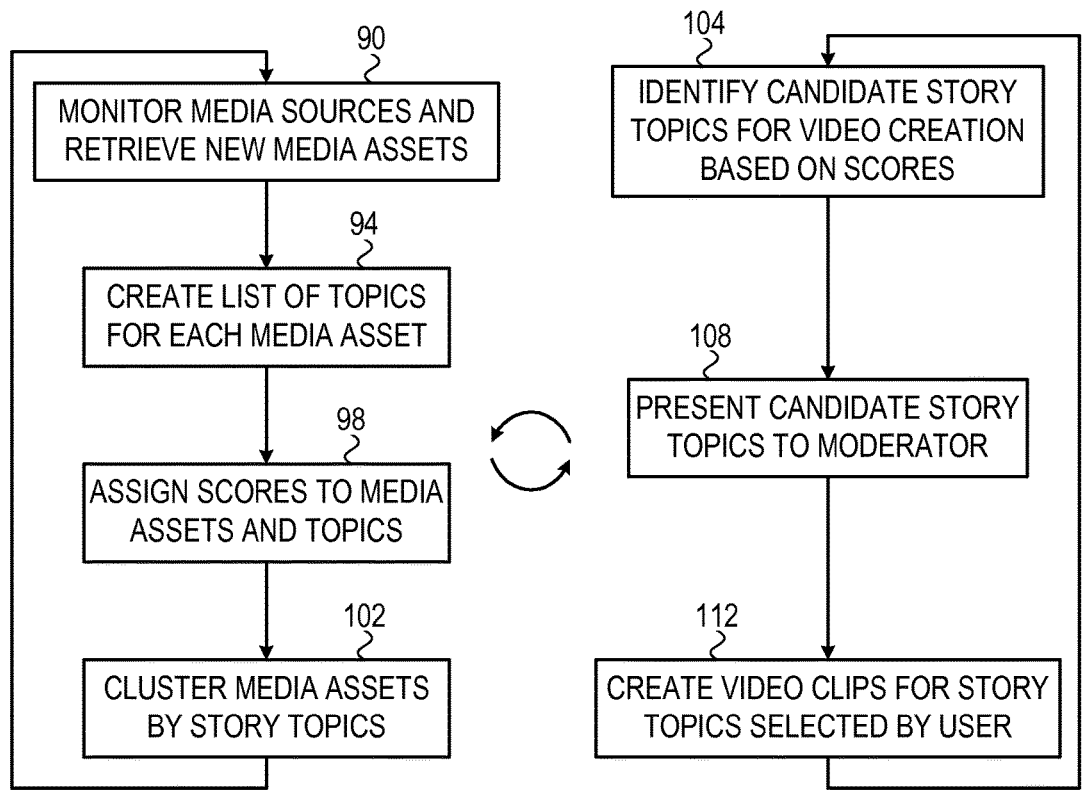
FIG. 2 is a flow chart that schematically illustrates a method for media-availability-driven creation of video clips, in accordance with an embodiment of the present invention.

FIG. 2 is a flow chart that schematically illustrates a method for media-availability-driven creation of video clips, in accordance with an embodiment of the present invention. In the present example, media monitoring unit 72 monitors media databases 36 and receives media items 40 via interface 68, at a media input step 90.

Unit 72 may monitor databases 36 periodically, for example every several minutes. Monitoring may be performed, for example, using suitable Application Programming Interfaces (APIs), by monitoring predefined "hot folders" or in any other suitable way. Each media item is typically accompanied with textual metadata, such as title, captions and/or descriptive keywords.

At a topic derivation step 94, media monitoring unit 72 constructs a list of one or more topics for each media item. Unit 72 typically derives the lists of topics by performing contextual analysis on the textual metadata on the respective media items. Unit 72 may also calculate or receive relevancy and sentiment measures for the topics. A relevance measure of a topic typically quantifies the relevance of the media item to the topic. A sentiment measure of a topic typically indicates the sentiment of users to that topic (e.g., positive, negative or neutral sentiment).

In addition, unit 72 typically defines a "story topic" for each media item. The story topic is typically, although not necessarily, based on the title of the media item. Consider, for example, a video excerpt showing the Pope visiting Moscow. The phrase "Pope visiting Moscow" may serve as a story topic for this media item. A topic list that may be derived from the metadata of this media item may comprise, for example, the list ["Pope" "Moscow" "Russia" "Vladimir Putin" "Church"].

At a scoring step 98, unit 72 assigns ranks or scores to the topics and to the visual media items. In some embodiments, media monitoring unit 72 maintains a topic table, which holds the topics and story topics of the received media items. Unit 72 calculates and stores in the table various scores that are assigned to the topics. Scores that may be calculated and stored per topic may comprise, for example, the current and average sentiment toward the topic, and social-media popularity or other "hotness" measures of the topic. Popularity measures may comprise, for example, the number and types (e.g., video vs. still images) of media items in which the topic appears during various time windows.

Unit 72 typically updates the scores in the topic table in real-time, e.g., to reflect real-time changes in sentiment and popularity. Updating may be performed, for example, by monitoring social-network Web sites.

In some embodiments, unit 72 calculates respective ranks for the visual media items. The rank assigned to a given media item is typically based on the scores of the topics appearing on the media item's topic list. In an embodiment, the rank of a given media item also depends on additional factors, such as availability of related audio content, or social-network popularity of the media item as projected by the media providers (e.g., number of viewings on the social-network site).

The ranks and scores described above are depicted purely by way of example. In alternative embodiments, unit 72 may use any other suitable ranks or scores.

At a clustering step 102, unit 72 clusters the visual media items by story topic. In an embodiment, upon arrival of a new visual media item, unit 72 evaluates the textual distances between the title of the item and the existing story topics within a given time window. If the distance to an existing story topic is small, unit 72 adds the new item to the cluster of the existing story topic. If all distances are large, unit 72 concludes that the new media item relates to a new story topic, and thus places the item in a new cluster.

In an embodiment, unit 72 calculates a respective composite score for each story topic, based on the ranks assigned to the visual media items belonging to the cluster of this story topic. (As explained above, the ranks of the visual media items in turn depend on the scores of the topics on their topic lists.)

Thus, the composite score of a given story topic is indicative of the quantity and quality of the visual media items relating to this story topic. A story topic having a high composite score (e.g., higher than other composite scores or higher than a threshold) is regarded as having sufficient suitable visual media for successfully generating a video clip.

The process of steps 90-102 above is typically repeated continuously by unit 72. In parallel, video creation unit 76 carries out a process of selecting story topics and creating video clips, as described in steps 104-112 below. Unit 76 uses the topic table described above as input, possibly in combination with additional inputs.

At a candidate identification step 104, video generation unit 76 selects one or more story topics as candidates for video-clip creation. Unit 76 typically chooses the story topics having the highest composite scores (e.g., higher than other composite scores or higher than a threshold).

At a presentation step 108, unit 76 presents the candidate story topics to moderator 44 using GUI unit 80. GUI unit 80 accepts the moderator input, which chooses which candidate story topics are to be used for automated video-clip generation. Unit 76 then generates video clips for the story topics that the moderator selected. Unit 76 generates the video clip for a given story topic using the visual media items belonging to the cluster of that story topic.

In various embodiments, depending on the scores and ranks used, unit 76 may suggest to the moderator story topics whose social-media popularity currently meets a predefined criterion, story topics whose number of associated visual media items currently meets a predefined criterion, story topics that are currently exhibiting a shift in average sentiment, or story topics having any other suitable kind of preference.

In some embodiments, having selected a story topic, moderator 44 may search for textual content to be used for narration of the video clip, or write the narration text himself. Textual content may be imported, for example, from Web-site links, from RSS feeds or from any other suitable source. After obtaining the textual content, unit 76 may enrich the video clip by searching for additional visual content.

Additionally or alternatively, when unit 76 already possesses textual stories (e.g., articles 28), it may match such textual stories to the visual media items and use the matching stories in the video clip. For example, unit 76 may calculate similarity scores between the textual stories (usually within a predefined time window) and the media items.

Example Graphical User Interface

In various embodiments, GUI unit 80 may present the candidate story topics to moderator 44 in various ways. In an example embodiment, GUI unit 80 presents to the moderator a display screen in which each candidate story topic is allocated a certain display area, also referred to as a tile. The size of the tile allocated on the screen to a given story topic depends on the composite score of that story topic. Thus, high-scoring story topics will be allocated large portions of the screen, whereas lower-scoring story topics will be allocated smaller portions of the screen.

Figure 3:
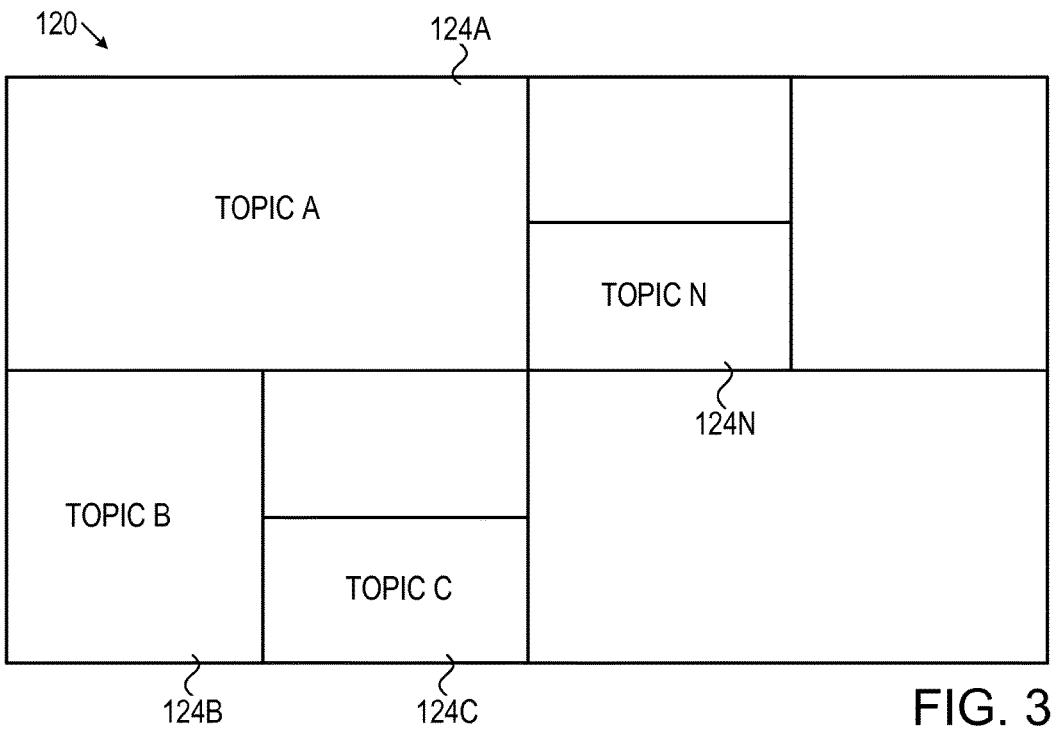
FIG. 3 is a diagram that schematically illustrates a Graphical User Interface (GUI) screen in a system for computer-aided generation of video clips, in accordance with an embodiment of the present invention.

FIG. 3 is a diagram that schematically illustrates a Graphical User Interface (GUI) screen 120 presented to moderator 44, in accordance with an embodiment of the present invention. In this example, the screen is divided into N windows ("tiles") 124A . . . 124N allocated for story topics A . . . N, respectively. In each window, GUI unit 80 displays selected (e.g., recent) visual media items belonging to the respective story topic.

In the present example, story topic A has the highest composite score, and therefore window 124A is allocated the largest screen area (¼ of the overall screen area). Topic B has the next-highest composite score, and therefore window 124B is allocated the next-largest screen area (⅛ of the overall screen area). Topics C and N in this example have lower composite scores, and therefore windows 124C and 124N are allocated smaller screen areas (1/16 of the overall screen area each). In one embodiment, the window area is indicative of the trendiness of the respective story topic.

This sort of visualization enables the moderator to focus on the story topics having the most promising potential, in terms of availability of visual media items and/or social-media popularity. Unit 80 typically refreshes display 120 in real-time, to reflect newly arriving media as well as changes in the composite scores of story topics.

Unit 80 may also display in a given window various parameters of the respective story topic, in addition to displaying visual media items. Such parameters may comprise, for example, a current relevance score for the story topic, the number of related media items received in a given time interval, the sentiment trend over time, or any other suitable parameter that may assist the moderator.

The GUI typically enables the moderator to navigate in and between different story topics. For example, clicking inside the window of a story topic can open a sub-window that presents its sub-topics. For each sub-topic, GUI unit 80 may again display relevant parameters along with recent media items.

Additionally or alternatively, clicking inside the window of a story topic can lead the moderator to a list of relevant textual stories, which the moderator can read and use in the video clip.

In some embodiments, the GUI enables the moderator to sort the media items of a given story topic by their ranks. This sort of presentation enables the moderator to view all media, or recently-arriving media, and focus on specific media items of interest.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving multiple visual media items from one or more media databases;
   associating the visual media items with one or more story topics; and
   in response to deciding that a given story topic is associated with sufficient suitable visual media items, initiating computer-aided creation of a video clip relating to the given story topic using the associated visual media items,
   wherein initiating the computer-aided creation comprises presenting to a human moderator one or more candidate story topics for which sufficient suitable visual media items are available, and receiving from the human moderator a selection of the story topic for which the video clip is to be created, and
   wherein presenting the candidate story topics comprises displaying to the human moderator multiple windows, which correspond to the respective candidate story topics and whose sizes depend on respective composite scores assigned to the candidate story topics.

2. The method according to claim 1, wherein associating the visual media items with the story topics comprises determining a respective story topic for each visual media item, and clustering the visual media items by finding textual similarities among the story topics.

3. The method according to claim 1, wherein deciding that the given story topic is associated with sufficient suitable visual media items comprises:
   assigning ranks to the received visual media items;
   evaluating a composite score for the given story topic based on the ranks of the visual media items associated with the given story topic; and
   deciding that the given story topic is associated with sufficient suitable visual media items depending on the composite score.

4. The method according to claim 3, wherein assigning a rank to a given visual media item comprises creating for the visual media item a list of one or more topics, and calculating the rank for the given visual media item based on scores given to the topics.

5. The method according to claim 4, and comprising assigning the scores to the topics based on at least one of:
   social-media popularity of the topics;
   estimated sentiment toward the topics;
   counts of media items in which the topics appear;
   types of the media items in which the topics appear; and
   availability of audio content relating to the topics.

6. The method according to claim 3, wherein assigning a rank to a given visual media item comprises ranking the given visual media item based on social-media popularity of the given visual media item.

7. The method according to claim 1, wherein deciding that the given story topic is associated with sufficient suitable visual media items comprises deciding that a social-media popularity measure of the given story topic meets a predefined criterion.

8. The method according to claim 1, wherein deciding that the given story topic is associated with sufficient suitable visual media items comprises deciding that a count of the visual media items associated with the given story topic meets a predefined criterion.

9. The method according to claim 1, wherein deciding that the given story topic is associated with sufficient suitable visual media items comprises detecting that the given story topic is undergoing a shift in sentiment.

10. Apparatus, comprising:
an interface, which is configured to receive multiple visual media items from one or more media databases; and
one or more processors, which are configured to associate the visual media items with one or more story topics, and, in response to deciding that a given story topic is associated with sufficient suitable visual media items, to initiate computer-aided creation of a video clip relating to the given story topic using the associated visual media items,
wherein the processors are configured to present to a human moderator one or more candidate story topics for which sufficient suitable visual media items are available, and to receive from the human moderator a selection of the story topic for which the video clip is to be created, and
wherein the processors are configured to display to the human moderator multiple windows, which correspond to the respective candidate story topics and whose sizes depend on respective composite scores assigned to the candidate story topics.

11. The apparatus according to claim 10, wherein the processors are configured to associate the visual media items with the story topics by determining a respective story topic for each visual media item, and clustering the visual media items by finding textual similarities among the story topics.

12. The apparatus according to claim 10, wherein the processors are configured to:
assign ranks to the received visual media items;
evaluate a composite score for the given story topic based on the ranks of the visual media items associated with the given story topic; and
decide that the given story topic is associated with sufficient suitable visual media items depending on the composite score.

13. The apparatus according to claim 12, wherein the processors are configured to assign a rank to a given visual media item by creating for the visual media item a list of one or more topics, and calculating the rank for the given visual media item based on scores given to the topics.

14. The apparatus according to claim 13, wherein the processors are configured to assign the scores to the topics based on at least one of:
social-media popularity of the topics;
estimated sentiment toward the topics;
counts of media items in which the topics appear;
types of the media items in which the topics appear; and
availability of audio content relating to the topics.

15. The apparatus according to claim 12, wherein the processors are configured to assign a rank to a given visual media item based on social-media popularity of the given visual media item.

16. The apparatus according to claim 10, wherein the processors are configured to decide that the given story topic is associated with sufficient suitable visual media items by deciding that a social-media popularity measure of the given story topic meets a predefined criterion.

17. The apparatus according to claim 10, wherein the processors are configured to decide that the given story topic is associated with sufficient suitable visual media items by deciding that a count of the visual media items associated with the given story topic meets a predefined criterion.

18. The apparatus according to claim 10, wherein the processors are configured to decide that the given story topic is associated with sufficient suitable visual media items by detecting that the given story topic is undergoing a shift in sentiment.

19. A computer software product, comprising a non-transitory computer-readable medium in which program instructions are stored, which instructions, when read by one or more processors, cause the processors to receive multiple visual media items from one or more media databases, to associate the visual media items with one or more story topics, and, in response to deciding that a given story topic is associated with sufficient suitable visual media items, to initiate computer-aided creation of a video clip relating to the given story topic using the associated visual media items,
wherein initiating the computer-aided creation comprises presenting to a human moderator one or more candidate story topics for which sufficient suitable visual media items are available, and receiving from the human moderator a selection of the story topic for which the video clip is to be created, and
wherein presenting the candidate story topics comprises displaying to the human moderator multiple windows, which correspond to the respective candidate story topics and whose sizes depend on respective composite scores assigned to the candidate story topics.

* * * * *